Aug. 28, 1934.   T. EICHMANN ET AL   1,971,397
REFRIGERATING APPARATUS
Filed Dec. 19, 1932
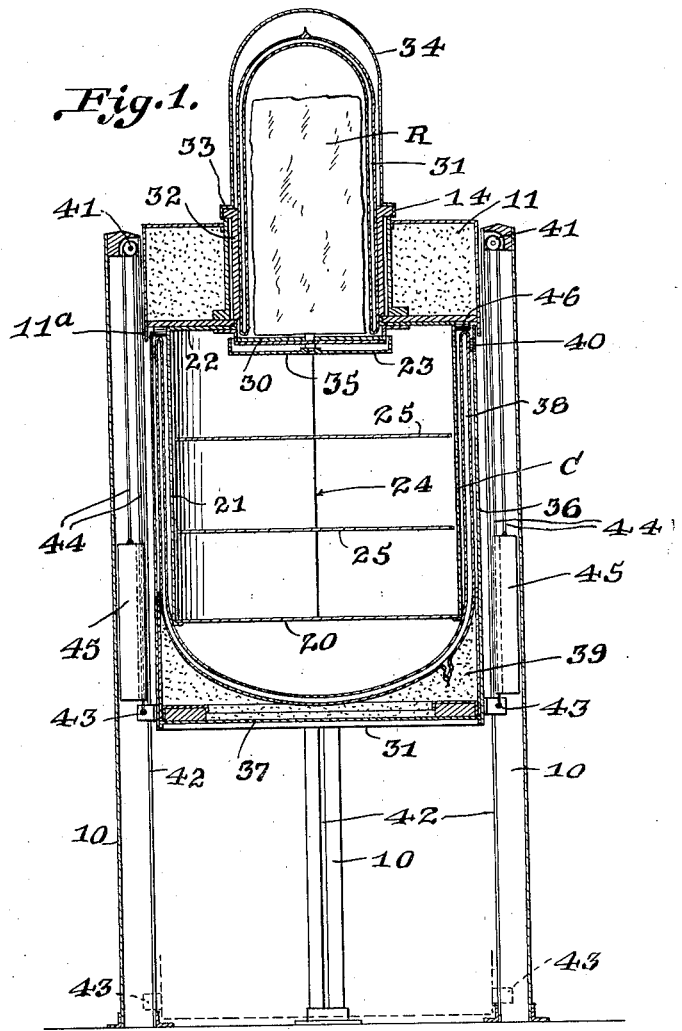
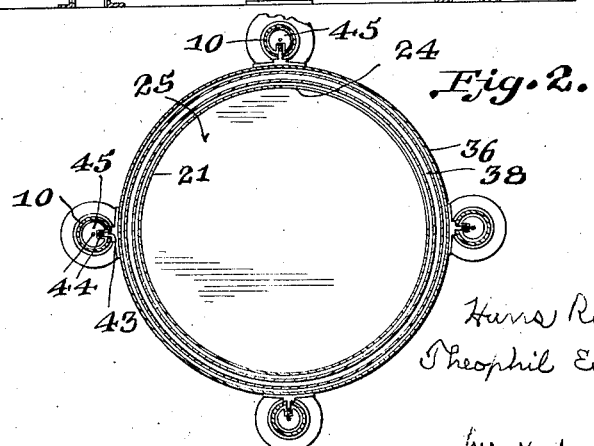

Patented Aug. 28, 1934

1,971,397

UNITED STATES PATENT OFFICE 1,971,397

REFRIGERATING APPARATUS

Theophil Eichmann and Hans Rufener, Bern-Liebefeld, Switzerland, assignors to International Carbonic Engineering Company, Kennett Square, Pa., a corporation of Delaware Application December 19, 1932, Serial No. 648,025
In Switzerland December 23, 1931

11 Claims. (Cl. 62—91.5)

This invention relates to certain improvements in refrigerating apparatus; and the nature and objects of the invention will be readily recognized and understood by those skilled in the arts involved in the light of the following explanation and detailed description of the accompanying drawing, illustrating what we at present believe to be the preferred embodiment or mechanical expression of our invention from among various other forms, arrangements, combinations and constructions of which the invention is capable within the spirit and scope thereof.

Our invention deals primarily with the provision of refrigerating apparatus adapted and intended for utilizing solid carbon dioxide and such like solidified gases, as a refrigerant, but it is to be understood that the invention is not limited in every phase and feature thereof to refrigerating apparatus designed for the use of carbon dioxide as a refrigerant, as there are certain features of the invention of general adaptation to refrigerating apparatus designed for utilizing other refrigerants, such, for example, as water ice, as well as other methods of refrigeration.

A general object of the invention is to provide a refrigerating apparatus particularly adapted for the preservation and refrigeration of food stuffs, although not so limited, which apparatus is so designed as to obtain the maximum refrigerating effect from the refrigerant with a minimum of loss, and to provide for a substantial elimination of a large part of the losses in refrigerating effect heretofore encountered by opening the refrigerating compartment to the outside air when it is desired to gain access to the contents of such compartment.

The invention is featured and characterized by an arrangement of refrigerating apparatus in which the physical characteristics of the carbon dioxide gas generated by the sublimination and evaporation of the solid carbon dioxide are efficiently utilized to obtain maximum refrigerating effect by a substantial reduction of cold losses to the outside air when a refrigerating space in the apparatus is opened to gain access to such space for insertion and removal of matter to be refrigerated.

The invention is further characterized by an arrangement of refrigerating apparatus in which the refrigerating compartment is formed and provided by an elevated container having a side wall opening for access to the interior thereof, together with a vertically movable and highly heat insulated open upper end inclosure or jacket which is raised to fit over, surround and enclose, the compartment and its side wall opening, and which jacket may be lowered any distance desired to expose only the required extent of the refrigerating container side wall opening necessary to gain access to that portion of the interior of the refrigerating compartment which it may be desired to reach.

Another feature of the invention of general adaptation to refrigerating apparatus of the broad type here exemplified, but which is of peculiar utility for such apparatus utilizing solid carbon dioxide, consists in permitting the very cold carbon dioxide gases to circulate downwardly, due to their specific gravity, through the refrigerating compartment from a source of solid carbon dioxide located above such compartment, and then to open and expose a side wall opening in the compartment progressively from the upper end of the compartment to the required extent so that a minimum of cold gas loss results, due to the weight of the cold gases and their tendency to move downwardly and remain in the lower portions of the compartment against upward circulation.

A further feature of the invention is found in the design and arrangement of the refrigerating container or compartment enveloping and enclosing jacket by which this jacket is formed to include an open top doubled wall vacuum insulated vessel to afford a maximum of heat insulation around and surrounding the refrigerating compartment when the jacket is in its normal position enclosing the refrigerating container, and also to afford maximum insulation for the cold gases therein when the jacket and container are in relative positions to expose the container for access thereto.

Another feature of the invention is presented by the design arrangement and mounting of the solid carbon dioxide refrigerant receiving compartment or container at the upper end of and in thermal relation with the refrigerating compartment, for passage and circulation of the cold gases from the evaporation of the solid carbon dioxide downwardly into and through the refrigerating compartment and the interior of the compartment closing and enveloping jacket; and further in the design and construction of the refrigerant compartment for efficient heat insulation, while permitting the compartment to be readily opened for charging with refrigerant.

With the foregoing features, objects and characteristics in view, as well as certain others which will be readily apparent and recognized from the following explanation, the invention consists in certain novel features in construction and in design and relative arrangement and combination of elements and parts, all as will be hereafter more fully referred to and specified.

Referring to the accompanying drawing in which similar reference characters refer to corresponding parts throughout the figures thereof:

Fig. 1 is a vertical transverse section through a refrigerating apparatus, embodying the various features of the invention and showing the refrigerating compartment enclosing jacket in its raised compartment closing and enveloping position; the maximum lowered position of this jacket being indicated in dotted lines.

Fig. 2 is a horizontal transverse section taken through the refrigerating apparatus of Figure 1.

In the illustrated example hereof, a refrigerating apparatus incorporating the principles and features of the invention includes a plurality of vertical and tubular columns or supporting posts 10 arranged spaced apart on a circle, that is, spaced apart in diametrically opposite pairs, and carrying and supporting an insulating top closure or cover member 11 on and between their upper ends, as clearly shown in Fig. 1 of the drawing. This member 11 is in the general form of a hollow annulus, in the specific example hereof, the interior of which is filled with a suitable heat insulating material. The member 11 is thus formed with an axial, vertical and circular opening therethrough, and the outside diameter of the member is substantially equal to the space between diametrically opposite columns 10, so that member 11 substantially fills or occupies the space between the upper ends of these columns. The top insulating wall or member 11 is fixed to and mounted on and between the upper ends of the columns 10 in any suitable or desired manner, to retain in the specific form of the example hereof, a fixed position on columns 10, although the invention is not so limited, as will be referred to and explained hereinafter with respect to an arrangement of the apparatus in which member 11 may be vertically movably mounted on such columns or other supporting means.

A circular form of container or casing comprising the closed bottom or lower wall 20, circular side wall 21, and top wall 22, is mounted and secured by its top wall 22 to the under side of top insulating member 11, and depends downwardly from member 11 between and spaced from columns 10, to provide the elevated refrigerating space or compartment C, therewithin, as shown by Fig. 1 of the drawing. The upper or top wall 22 of the refrigerating compartment C forming container, is in the example here selected, provided with a central, circular opening therethrough in vertical alinement with the axial opening or passage through the top insulating member 11, while a portion of the circular side wall 21 of the container is removed to form the side wall opening 24 through which access may be had to the interior of the refrigerating compartment C. Preferably, as in the illustrated example of Fig. 1, vertically spaced, horizontal shelves 25 are mounted in and across the container to provide article supports dividing the compartment C into sections. The mounting and arrangement of the shelves 25 is also preferably such as to permit a free circulation of air and gases therethrough and between the sections into which the compartment C is divided.

The top insulating wall or member 11 mounts and carries the refrigerating unit which holds the refrigerant for cooling and refrigerating the compartment C. For instance, in the example here selected, a refrigerant holding and supporting wall or plate 30 is mounted across and below the opening in top wall 22 of the refrigerating container disposed within compartment C (see Fig. 1), and suitable apertures or openings are provided in its mounting, and/or through the plate, as may be desired to permit of passage of refrigerant gases into compartment C. The space above plate 30 within the axial opening or passage through the top insulating member 11, provides and defines a refrigerant receiving chamber for a refrigerant R placed therein on the wall or plate 30. This refrigerant receiving space is heat insulated and removably closed by, and is extended a distance upwardly above the top insulating member 11 through the medium of an inverted double walled, vacuum insulated jar or bell 31 which is mounted in position extended downwardly through the opening in member 11.

A supporting and holding sleeve 32 of heat insulating material, in the example here shown, is secured around the exterior of the lower portion of the jar 30 and is provided around its upper end with a radial flange 33 for removably seating and resting upon the upper side of member 11 to removably mount the jar in position in the member 11. This sleeve 32 is of a depth or length to extend through member 11 opening to the lower or under side wall thereof, while jar 31 extends inwardly to the refrigerant supporting plate 30. The upwardly extended and closed outer end length of jar 31 is preferably covered and protected by a metal cap or the like 34 which is suitably secured at its lower end to sleeve 32.

The jar 31 with mounting sleeve 32 and protective cap 34 form a unit which is removed from mounted position for charging the apparatus with refrigerant. With jar 31 removed, a block of refrigerant R is inserted in the heat insulating member 11 onto the supporting plate 30. The jar 31, with its open lower end, is then placed over the block of refrigerant R and lowered into the mounted position of Fig. 1 over enclosing and efficiently heat insulating block of refrigerant R, which in the example hereof, is solidified carbon dioxide, or other solidified gas refrigerant. Thus, heat is transferred from compartment C through plate 30 to the lower end of refrigerant block R, which sublimes and the intensely cold gases generated escape or seep from the open lower end of jar 31 between the lower edge thereof and plate 30, into the refrigerating compartment C, as will be readily understood.

As there will result from the intense cold at plate 30, the formation and collection of frost or water ice on such plate, by the freezing out of moisture from the air, the invention provides a collection or drip pan or dish 35 which may be removably attached to the plate 30 in position suspended therebelow to catch and collect moisture drip. If desired or found expedient any usual water drain means, such as a valve can be provided on the pan 35 for draining the same to avoid the necessity of drip pan removal.

In accordance with a further feature of our invention, provision is made for a heat insulating enclosure for the refrigerating compartment C, which enclosure is capable of movement to expose to a required extent, the compartment side opening 24 in order that access may be had through such opening to the container. Such an enclosure can embody, as in the specific example hereof, a circular casing 36 having the closed bottom wall 37 and an open top, within which is mounted and secured a double-walled, vacuum insulated lining in the form of an open top container having an internal diameter sufficient to receive therewithin, the refrigerating compartment forming container. This vacuum insulated container or lining 38 is, in this instance, formed with a curved bottom wall, which is seated in and supported on a body of heat insulating material 39 provided in the lower end of casing 36 on the bottom wall 37 thereof. The insulating material 39 is so arranged as to fill and fully occupy the space between the bottom of casing 36 and the bottom or lower end portion of container or vacuum insulated lining 38. (See Fig. 1). Preferably a suitable spacing member or ring 40 is provided at and adjacent the upper end of heat insulated container 38 between the side wall of such container and casing 36.

The heat insulated enclosure formed by casing 36 and vacuum insulated container 38 therein, is vertically movably mounted in position beneath top insulating member 11, on the vertical columns 10. For instance, each of these tubular columns 10 may have a pulley 41 mounted at the upper end thereof, and each is provided with a vertical slot 42 therein, along its inner side. Radially extended ears 42 are provided spaced apart around the lower end of casing 36, and extend and are vertically slidably received in the column slots 42, respectively. Cables or other suitable flexible connections 44 are connected at one end to ears 43, respectively, and extend upwardly over column pulleys 41, and then downwardly into columns 10, where they are secured to the weights 45, respectively, which are vertically movably confined within these tubular columns. The weights 45 counterbalance the insulating enclosure provided by casing 36 and such enclosure is vertically movably supported thereby and therefrom. The insulating enclosure or jacket so mounted, is movable upwardly into the position over and completely receiving and enclosing the compartment C forming container, with the open upper end of the enclosure engaged and closed by top insulating member 11, as shown in Fig. 1 of the drawing. In such position the refrigerating compartment side opening 24 is completely closed to the exterior of the enclosure or jacket but opens into the vacuum insulated container or lining 38.

In refrigerating compartment enclosing and heat insulating position, the upper edge of container 38 may preferably engage a seating ring member or the like, 46, secured to the under side of top insulating member 11 in such a manner as to permit escape of gases from container 38, for discharge to atmosphere. Further, if desired, and as disclosed in Fig. 1 of the drawing, the upper edge of casing 36 may terminate spaced from member 11 for outward passage of gas, while the outer side wall of member 11 may depend a distance below but spaced outwardly from the upper edge of the casing side wall to provide the skirt 11a to permit discharge of the gas there beneath to atmosphere. In such arrangement, the spacing member 40 may serve to prevent passage of gas into the space between casing 36 and container 38.

In operation and use of the refrigerating apparatus of the described example, the articles to be refrigerated are placed in compartment C and the heat insulating enclosure 36—38 is moved upwardly into the position of Fig. 1. The heat transfer from compartment C to the solid carbon dioxide R, causes sublimation thereof, and the cold sublimation gases, due to their specific gravity, circulate into and through compartment C and vacuum insulated container 38, tending to collect in the lower ends thereof, but having paths of escape from the upper end of the enclosure. When it is desired to gain access to the compartment C, the enclosure 36—38, is moved downwardly to expose the compartment side opening 24 only to a sufficient extent to permit of removing the desired article. Due to the specific gravity of the cold carbon dioxide gases, when compartment C is thus opened, progressively, from the upper end, a minimum loss of cold to the outside air takes place, and where, as is desirable, those articles in compartment C most frequently needed, are placed in the upper part of the compartment, say on upper shelf 25, a minimum extent of opening of the compartment is required and material reduction in heat losses are gained as against complete compartment opening. This result is further appreciably contributed to by the arrangement and relative mounting of the open top heat insulating jacket or enclosure 36—38 by which the specific gravity of the gases is utilized to minimize discharge thereof from the top of the enclosure when the latter is lowered to open compartment C.

The weights 45 preferably counterbalance the vertically movable heat insulating enclosure or jacket 36—38, so that such enclosure is readily movable to and from position closing compartment C, and the enclosure will remain in any position to which moved. However, if desired or found expedient, the weights 45 can be arranged to overbalance the weight of the enclosing jacket, so as to always raise the same to its closed position when released from a lowered compartment opening position.

While in the form of the invention which we happen to have selected for the instant example, the top insulating member 11 carrying the cooling unit and refrigerating compartment is fixed and the enclosing jacket 36—38 is movable, the invention recognizes and includes as equivalent, a reverse arrangement in which the enclosing jacket is fixed and top insulating member 11 is mounted on the cables and weights for vertical movements to and from closed position in the enclosing jacket; or an arrangement in which both member 11 and the enclosing jacket are relatively vertically movable. The feature of the invention consists broadly in relative movement between the refrigerating compartment and the enclosing jacket for progressively opening and closing the former.

It is also evident that various other changes, modifications, variations, substitutions, eliminations and additions might be resorted to without departing from the spirit and scope of our invention, and hence we do not desire to limit ourselves in all respects to the exact and specific disclosures hereof.

What we claim, is:

1. In refrigerating apparatus, a closed, cold gas retaining refrigerating compartment having a side wall opening therethrough, and a heat insulating unit enclosing said compartment to close the compartment side wall opening, the enclosing unit and compartment relatively movable to progressively expose said compartment opening to any desired extent for access to the compartment.

2. In refrigerating apparatus, a closed, cold gas retaining refrigerating compartment having a side wall opening, a heat insulated open-top enclosing jacket below said compartment, said jacket mounted for vertical movements to and from position enclosing and surrounding the compartment to heat insulate the same and close the compartment opening, said jacket in compartment enclosing position in communication with the compartment through the side wall opening, an upper insulating member above the compartment for closing said jacket open upper end in raised, compartment closing position of said jacket, and said insulating jacket movable downwardly to progressively open the compartment side wall opening to any desired extent, the compartment walls and the jacket substantially retaining cold gas within the portion of the compartment below the exposed side wall opening.

3. In refrigerating apparatus, a refrigerating compartment having a side wall opening for access to the interior thereof, a heat insulating jacket unit surrounding and enclosing the compartment to insulate the same and close the side wall opening thereof, and said unit mounted for withdrawal from said chamber to progressively expose said compartment side wall opening to a desired extent with the compartment walls closing the interior of the compartment against cold gas escape from the compartment except through the exposed area of the side wall opening.

4. In refrigerating apparatus, a closed refrigerating compartment having a side wall opening, a heat insulating enclosure including an open top double-walled vacuum insulated container, said enclosure mounted for movement to position surrounding and enclosing said compartment and the side opening thereof, and movable to position progressively exposing said compartment side opening for access to the interior thereof.

5. In refrigerating apparatus for utilizing solidified gas as a refrigerant, a substantially closed refrigerating compartment having a side wall opening and an upper heat insulating wall, a refrigerant unit mounted on said upper wall in thermal relation with and for passage of cold refrigerant gases into said compartment and substantial retention of said gases therein by the compartment walls, an open-top heat insulating enclosing unit below said compartment for movement upwardly thereover to position enclosing the compartment and closing the compartment side opening, said unit in raised enclosing position having its open-top substantially covered by said upper heat insulating wall and receiving refrigerant gases through the compartment side opening, and the said unit movable downwardly to positions progressively exposing the compartment side opening for access to the interior of the compartment with the cold gases in the compartment substantially maintained against escape through the area of the exposed side wall opening, by the compartment walls and the wall of said enclosing unit.

6. In refrigerating apparatus for utilizing solid carbon dioxide and the like as a refrigerant, in combination, a substantially closed refrigerating compartment having a side wall opening, a solid carbon dioxide holding unit at the upper side of said compartment in thermal relation therewith and for passage of cold sublimation gases thereinto, and a heat insulating open-top enclosing jacket below and positioned up over and enclosing said compartment to close the side opening thereof, but receiving refrigerant gases therethrough, means being provided for substantially closing the open-top of said jacket in compartment enclosing position thereof, and the said insulating jacket movable downwardly to progressively expose said compartment opening for access to the interior of the compartment with the cold sublimation gases retained in the compartment against escape to the atmosphere by the compartment and jacket walls, except through that portion of the side wall opening exposed by lowering said jacket.

7. In refrigerating apparatus utilizing solid carbon dioxide and the like as a refrigerant, a closed refrigerating compartment having a side wall opening, a refrigerant holding unit above said compartment in thermal relation therewith for discharge of refrigerant gases downwardly thereinto, and a vertically movable heat insulating jacket positioned up, over and around said compartment to enclose the same and close the side opening but receiving refrigerant gases from such opening into the space between the jacket and the compartment walls, and the jacket movable downwardly to positions exposing any extent or all of said side opening for access to the interior of the compartment.

8. In a refrigerating apparatus, an elevated closed refrigerating compartment having a side wall opening therethrough, a heat insulating wall member across and covering the upper side of said compartment, a solidified gas refrigerant holding unit mounted on said insulating wall and extending therethrough into the upper end of the compartment in thermal relation therewith and for refrigerant gas discharge thereinto, an open-top insulating jacket vertically movably mounted and supported below said elevated compartment, said jacket movable upwardly over and enclosing the compartment to a position with its open-top substantially covered by said insulating upper side member and with the jacket closing the compartment side opening, said jacket in raised position enclosing the compartment providing a space between the compartment and the jacket to receive gas through the compartment side wall opening, and the said insulating jacket movable downwardly to positions exposing any extent or all of the compartment side opening for access to the compartment.

9. In refrigerating apparatus, an elevated refrigerating compartment having a side opening therethrough, a supporting structure for said compartment including an insulating member over and across the upper side of the compartment, a refrigerant holding unit mounted on the insulating member in thermal relation with the compartment for refrigerating the same, said unit including an inverted vacuum jar removably mounted therein for enclosing and heat insulating a charge of refrigerant, an open-top insulating enclosing jacket vertically movably supported from the supporting structure in vertical alinement with the compartment, said heat insulating jacket movable upwardly to position over and enclosing the compartment to heat insulate the latter and close the side opening thereof, and the said jacket movable downwardly to positions exposing the compartment side opening.

10. In refrigerating apparatus, a closed, cold gas retaining refrigerating compartment having a side wall opening therethrough, a solidified gas holding unit at the upper side of said compartment and in communication at its lower end therewith for discharge of cold refrigerant gas into the compartment, an open-top heat insulating unit fitted up, over and surrounding said compartment and in communication therewith through the compartment side wall opening, said insulating unit closing the side wall opening from the exterior thereof, and said compartment and heat insulating enclosing unit relatively movable toward and from each other to open and close the compartment side wall opening.

11. In refrigerating apparatus, a closed refrigerating compartment having a side wall opening therethrough, an upper heat insulating wall of substantial thickness over and covering the upper side of said compartment and formed with a vertical opening therethrough into said compartment, a refrigerant support in the compartment across the lower end of said wall opening, a heat insulating enclosure removably mounted down into said opening for fitting over and enclosing a charge of solidified gas refrigerant in the opening supported on the refrigerant support at the lower end of the opening in the compartment, said refrigerant support providing for passage of cold refrigerant gases into the compartment, an open-top insulating jacket positioned up, over and around said compartment with its upper edge engaged with said compartment top wall around the compartment to enclose the compartment and close the side wall opening thereof, said enclosing jacket receiving cold refrigerant gases through the compartment side wall opening, and said jacket movable downwardly from the compartment to lowered positions exposing the desired extent of the compartment side wall opening for access to the interior of the refrigerating compartment.

THEOPHIL EICHMANN.
HANS RUFENER.